United States Patent [19]

Kellberg

[11] 4,246,034

[45] Jan. 20, 1981

[54] DEVITRIFYING SOLDER SEALING GLASSES

[75] Inventor: Howard E. Kellberg, Corning, N.Y.

[73] Assignee: Corning Glass Works, Corning, N.Y.

[21] Appl. No.: 112,080

[22] Filed: Jan. 14, 1980

[51] Int. Cl.³ .............................................. C03C 3/10
[52] U.S. Cl. .................................... 106/53; 106/73.4; 106/39.6; 106/47 R; 428/428
[58] Field of Search ................ 106/39.6, 53, 49, 73.4, 106/47 R

[56] References Cited

U.S. PATENT DOCUMENTS

| | | | |
|---|---|---|---|
| 4,097,296 | 6/1978 | Thomas et al. | 106/53 |
| 4,131,478 | 12/1978 | Davis et al. | 106/53 |
| 4,133,690 | 1/1979 | Muller | 106/53 X |

*Primary Examiner*—Helen M. McCarthy
*Attorney, Agent, or Firm*—Clinton S. Janes, Jr.

[57] ABSTRACT

A thermally devitrifiable sealing composition exhibiting a sealing temperature below about 420° C. and compatibility with a glass having a linear coefficient of thermal expansion (0°–300° C.) of about $83 \times 10^{-7}/°$ C. consisting of about 4–10 parts by weight of particulate cordierite for each 100 parts by weight of a devitrifiable glass consisting essentially, expressed in parts by weight on the oxide basis as calculated from the batch, of about

| | |
|---|---|
| PbO | 77.4 ± 2.0 |
| ZnO | 10.2 ± 1.0 |
| $B_2O_3$ | 8.9 ± 1.0 |
| $SiO_2$ | 2.6 ± 0.25 |
| MgO | 0.17 ± 0.10 |
| BaO | 0.22 ± 0.10 |
| F | 0.35 ± 0.10 |

2 Claims, No Drawings

DEVITRIFYING SOLDER SEALING GLASSES

Background of the Invention

Thermally devitrifiable sealing glasses have been utilized for a number of years for sealing together the glass funnel and panel components of color television picture tubes. Such sealing glasses at least partially devitrify or crystallize during the sealing operation, thereby generally rendering them mechanically stronger than stable glass sealing compositions. Those glasses had their genesis in U.S. Pat. No. 2,889, 952 which describes $PbO-ZnO-B_2O_3$ compositions particularly designed for use in the fabricaton of evacuated electron tubes and the like. The glasses form a seal at relatively low temperatures but are transformed during the sealing step to a crystalline material which is much more refractory, thereby resisting thermal deformation to temperatures well above the temperature at which sealing is performed. The glasses recited in the patent exhibit coefficients of thermal expansion between $80-120 \times 10^{-7}/°C$. and are stated to be suitable for making seals at 420°-450°C.

U.S. Pat. No. 3,250,631 discloses the addition of an inert refractory metal oxide to thermally devitrifiable sealing glasses, the coefficient of thermal expansion of this refractory component being at least $15-25 \times 10^{-7}/°C$. units lower than that of the sealing glasses after devitrification. The specific glass compositions disclosed were within the $PbO-ZnO-B_2O_3$ system and fused quartz and beta-eucryptite were noted as being useful refractory material additions. Firing temperatures of about 425° C. were asserted to be operable.

U. S. Pat. No. 3,258,350 teaches the addition of zircon particles to stable as well as thermally devitrifiable sealing glasses to reduce the overall thermal expansion of the glasses. Suitable glasses are included within the $PbO-B_2O_3-SiO_2$ and $PbO-SnO-B_2O_3$ fields and demonstrate coefficients of thermal expansion of at least $80 \times 10^{-7}/°C$.

U.S. Pat. No. 3,734,702 discloses the inclusion of aluminum titanate in $PbO-B_2O_3-SiO_2$ and $PbO-ZnO-B_2O_3$ thermally devitrifiable sealing glasses which delays the development of devitrification, thereby allowing more time for sealing parts together without uneven stress concentrations.

U.S. Pat. No. 3,951,669 reveals the addition of zinc beta-quartz refractory fillers to lower the coefficient of thermal expansion of $PbO-B_2O_3$ and $PbO-B_2O_3-SiO_2$ sealing glasses such that sealing of lower expansion glasses can be undertaken without excessive mismatch between the seal and the glass.

U.S. Pat. No. 3,954,486 describes sealing glasses in the $PbO-ZnO-B_2O_3$ system containing particulate refractory fillers having particle sizes between 37–150 microns (~150–450 Tyler mesh). The refractory fillers explicitly recited included silica, beta-spodumene, petalite, beta-eucryptite, $Al_2O_3$, clay, $ZrO_2$, $SnO_2$, zircon, and lithium aluminosilicate glass-ceramics.

U.S. Pat. No. 3,963,505 discloses modifying a $PbO-B_2O_3-SiO_2$ or $PbO-ZnO-B_2O_3-SiO_2$ thermally devitrifiable sealing glass by incorporating a particulate zinc-containing filler material therein, e.g., zinc borate, zinc oxide, and zinc silicate, which dissolves in the glass and results in the development of $2PbO.ZnO.B_2O_3$ crystals when the glass devitrifies during the sealing operation.

U.S. Pat. No. 4,097,296 teaches the production of thermally devitrifiable sealing compositions consisting of 2–6 parts by weight of particulate zircon for each 100 parts by weight of sealing glass, wherein the glass consists essentially, in parts by weight, of about:

| | |
|---|---|
| PbO | 77.4 ± 2.0 |
| ZnO | 10.2 ± 1.0 |
| $B_2O_3$ | 8.9 ± 1.0 |
| $SiO_2$ | 2.6 ± 0.25 |
| MgO | 0.17 ± 0.10 |
| BaO | 0.22 ± 0.10 |
| F | 0.35 ± 0.10 |

Those glasses were especially suitable for sealing together the commercial funnel and panel glasses for color television picture tubes having coefficients of thermal expansion (0°–300° C.) of about $98 \times 10^{-7}/°C$. The patented sealing glasses exhibit a sealing temperature of about 410°–425° C. and provide a seal having a thermal expansion mismatch value against the color television picture tube glass which is within the range of −125 to 0 parts per million at room temperature and which does not change more than about 40 parts per million over the temperature range of 350°–200° C.

In recent years much research and development activity has been undertaken in the field of gaseous discharge flat panel display devices. This activity has concentrated in two general areas: the alpha numeric flat panel display and the television flat panel display. One approach to developing such devices, particularly the television flat panel display, has involved the use of Corning 8603 glass, an alkali metal zinc silicate composition marketed by Corning Glass Works, Corning, New York exhibiting an annealing point of about 454° C., a strain point of about 416° C., and a coefficient of thermal expansion (0°–300° C.) of about $83 \times 10^{-7}/°C$. A sheet of that glass is sealed between two sheets of soda-lime glass having a coefficient of thermal expansion of about $90 \times 10^{-7}/°C$. The use of such glass has created the need for a sealing glass compatible therewith in terms of expansion coefficient and having a sealing temperature sufficiently low to avoid deformation of the Corning 8603 glass.

OBJECTIVE OF THE INVENTION

The primary objective of the instant invention is to provide thermally devitrifiable sealing glass compositions exhibiting sealing temperatures below about 420° C. and which are compatible with a glass having a coefficient of thermal expansion (0°–300° C.) of about $83 \times 10^{-7}/°C$., i.e., the devitrified seal demonstrates a thermal expansion mismatch value against that glass ranging between about −200 to +100 ppm at room temperature and does not change more than 50 ppm over the 350°–200° C. range.

SUMMARY OF THE INVENTION

That objective can be attained through the addition of about 4–10 parts by weight of particulate cordierite, a refractory material having the nominal mineral forumulation, on the molar basis, of $2MgO.2Al_2O_3.5SiO_2$ with a coefficient of thermal expansion of about $16 \times 10^{-7}/°C$., for each 100 parts by weight of the thermally devitrifiable glasses disclosed in U.S. Pat. No. 4,097,296, supra, i.e., the glasses consist essentially, in parts by weight on the oxide basis as calculated from the batch, of about:

| | |
|---|---|
| PbO | 77.4 ± 2.0 |
| ZnO | 10.2 ± 1.0 |
| B$_2$O$_3$ | 8.9 ± 1.0 |
| SiO$_2$ | 2.6 ± 0.25 |
| MgO | 0.17 ± 0.10 |
| BaO | 0.22 ± 0.10 |
| F | 0.35 ± 0.10 |

As was explained in U.S. Pat. No. 3,951,669 supra, the addition of an insoluble particulate material to a sealing glass sharply modifies the rheological behavior of the glass. Thus, the additive raises the viscosity of the sealing glass which, in turn, interferes with the flow thereof and thereby restricts the use of this practice. Accordingly, inasmuch as the sealing glass compositions operable in the instant invention demonstrate coefficients of thermal expansion (0°–300° C.) of about $100 \times 10^{-7}$/°C., the ideal additive to lower the expansion coefficient to the vicinity of about $83 \times 10^{-7}$/°C. would be one exhibiting a minimal effect upon glass flow, while concurrently causing a substantial reduction in the overall expansion coefficient of the mixture. The additive must also, of course, be inert to the sealing glass composition such that the properties desired therein are not substantively affected. Cordierite satisfies those two critical criteria when utilized as an additive with the above-recited base sealing glass compositions, i.e., it (1) exerts a minimal effect upon glass flow at the sealing temperature while effecting a substantial decrease in the coefficient of thermal expansion of the mixture, and (2) it is essentially chemically inert to the sealing glass.

DESCRIPTION OF THE PREFERRED EMBODIMENT

As has been elucidated in the prior art, additives have previously been employed to adjust the coefficient of thermal expansion of a sealing glass so as to avoid thermal expansion mismatch with consequent high seal stresses and possible seal failure. The well-known seal test was developed to measure thermal expansion mismatch. This test, which is highly sensitive, involves forming a seal between a sealing composition and a glass substrate and the thermal expansion mismatch between the substrate glass and the sealing composition is thereafter calculated from stress measurements utilizing conventional stress analysis equipment. The results of this test are generally reported in terms of parts per million (ppm) of length, adverting to the apparent difference in thermal contraction arising between the seal and the glass substrate upon cooling to room temperature after the sealing operation. A negative thermal expansion mismatch value customarily indicates a lower thermal contraction in the sealing composition than in the substrate glass and yields a seal under compression. Such seals are desirable because of their high mechanical strength.

U.S. Pat. No. 4,097,296 pointed out that not only is the extent of thermal expansion mismatch between the sealing composition and the substrate glass important at room temperature, but it is also of vital importance over the cooling range of 350°–200° C. Accordingly, a very low thermal expansion mismatch, less than about 50 ppm, can be tolerated over that range of temperatures.

In the following examples, the thermally devitrifiable sealing glass consisted essentially, expressed in parts by weight on the oxide basis as calculated from the batch, of about:

| | |
|---|---|
| PbO | 77.35 |
| ZnO | 10.33 |
| B$_2$O$_3$ | 9.0 |
| SiO$_2$ | 2.1 |
| MgO | 0.18 |
| BaO | 0.22 |
| F | 0.37 |

This composition exhibits a coefficient of thermal expansion (0°–300° C.) of about $100 \times 10^{-7}$/°C.

No special formulating or processing techniques are necessary to prepare the glass. Hence, a batch can be compounded from any ingredients, either oxides or other compounds, which, when melted together with the other components, will be converted into the desired oxides in the proper proportions. Since it is not known with what cation(s) the fluoride is associated, it is simply reported as fluoride, in accordance with conventional glass analysis practice. Melting of the batch will normally be conducted in contact with platinum, i.e., in platinum crucibles or in commercial, platinum-linked tanks, at temperatures in the vicinity of 1200° C. Because the glass will be used in the form of a fine frit, it is frequently convenient to pour the molten glass as a stream into a bath of water. The resultant small pieces of glass will be further milled to pass a No. 100 United States Standard Sieve (149 microns).

The cordierite component will customarily be added to the fritted glass via dry blending. In order to achieve the desired effective change in the coefficient of thermal expansion of the basic sealing glass, while insuring sufficient flow of the solder glass to permit the preparation of good seals, the cordierite is added as a fine powder, i.e., passing a No. 200 United States Standard Sieve (74 microns) and, preferably, a No.325 Sieve (44 microns).

The thermal expansion mismatch values recited in the following table were obtained utilizing the conventional seal test described above. The values represent the mismatch at room temperature and are expressed in ppm. The cordierite employed as the additive had the following chemical analysis in weight percent, the silica content being deemed to constitute the balance:

| | |
|---|---|
| Al$_2$O$_3$ | 34.1 |
| MgO | 13.1 |
| TiO$_2$ | 0.67 |
| CaO | 0.055 |
| SiO$_2$ | balance |

The material was comminuted to pass a No. 325 United States Standard Sieve and evidenced an average particle size of about 13.5 microns.

The sealing operation involved heating at about 10° C./minute to a temperature of about 415° C., maintaining that temperature for about 45 minutes, and then cooling to room temperature. For purposes of comparison, zircon was milled to pass a No. 325 United States Standard Sieve, dry blended with the fritted sealing glass, and the mixture then subjected to the above-described sealing operation.

| Additive | Mismatch |
|---|---|
| 2 parts cordierite | +338 |
| 5 parts cordierite | +80 |
| 6 parts cordierite | +20 |

-continued

| Additive | Mismatch |
|---|---|
| 2.5 parts zircon | +290 |
| 6 parts zircon | +281 |
| 13 parts zircon | +60 |
| 15 parts zircon | −69 |

As can readily be seen, about twice as much zircon is required to provide the desired low mismatch levels. This factor is of practical significance with respect to the viscosity and ease-of-sealing character of the composite glass additive mixture as will be seen below.

Powders of two composite sealing frits, one containing six parts of cordierite and the other 13 parts of zircon, were pressed into cylindrical shapes having a height of about 0.5" and a diameter of about 0.5". These cylinders were placed upon clean, smooth platinum foil and then introduced into an electrically-fired furnace to be subjected to the above-outlined sealing schedule. The heat treatment caused the frit cylinders to fuse and flow into the shape of a button, the diameter of which is a useful empirical measure of viscous flow. The rate of nucleation of the in situ devitrification was studied utilizing differential scanning calorimetry.

|  | 6 Parts Cordierite | Parts Zircon |
|---|---|---|
| Average Flow Button Diameter | 0.963 | 0.834" |
| Peak Nucleation Rate | 35 minutes | 18 minutes |
| Completion of Devitrification | 44 minutes | 22.5 minutes |

It is evident that the cordierite-containing composite exhibits greater flow, thereby insuring better wetting and bonding to the substrate. The slower devitrification rate thereof is also advantageous in that such provides a long seal time for heavier glass parts to achieve temperature homogeneity with accompanying more uniform crystallization throughout and avoiding uneven stress concentrations. Finally, microscopic examination of the devitrified sealing glass has indicated essentially no reaction between the cordierite grains and the base glass.

The preferred sealing compositions contemplate about 5–7 parts by weight of powdered cordierite for each 100 parts by weight of base thermally devitrifiable glass, said glass having the following approximate composition, expressed in parts by weight on the oxide basis as calculated from the batch of about

| PbO | 77.4 ± 0.2 |
|---|---|
| ZnO | 10.2 ± 0.2 |
| $B_2O_3$ | 8.9 ± 0.2 |
| $SiO_2$ | 2.6 ± 0.1 |
| MgO | 0.17 ± 0.03 |
| BaO | 0.22 ± 0.05 |
| F | 0.35 ± 0.05 |

Such compositions demonstrate a sealing temperature of about 415° C.

I claim:

1. A thermally devitrifiable sealing composition consisting of about 4–10 parts by weight of particulate cordierite passing a No. 200 United States Standard Sieve for each 100 parts by weight of a devitrifiable glass consisting essentially, expressed in parts by weight on the oxide basis as calculated from the batch, of about

| PbO | 77.4 ± 2.0 |
|---|---|
| ZnO | 10.2 ± 1.0 |
| $B_2O_3$ | 8.9 ± 1.0 |
| $SiO_2$ | 2.6 ± 0.25 |
| MgO | 0.17 ± 0.10 |
| BaO | 0.22 ± 0.10 |
| F | 0.35 ± 0.10 | said sealing composition exhibiting a sealing temperature below about 420° C. and providing a devitrified seal having a thermal expansion mismatch value against a glass having a coefficient of thermal expansion (0°–300° C.) of about $83 \times 10^{-7}$/°C. ranging between about −200 to +100 ppm at room temperature and does not change more than about 50 ppm over the 350°–200° C. temperature range.

2. A sealing composition according to claim 1 consisting of about 5–7 parts by weight of particulate cordierite for each 100 parts by weight of devitrifiable glass, said glass having the approximate composition, expressed in parts by weight on the oxide basis as calculated from the batch, of about

| PbO | 77.4 ± 0.2 |
|---|---|
| ZnO | 10.2 ± 0.2 |
| $B_2O_3$ | 8.9 ± 0.2 |
| $SiO_2$ | 2.6 ± 0.1 |
| MgO | 0.17 ± 0.03 |
| BaO | 0.22 ± 0.05 |
| F | 0.35 ± 0.05 | said composition demonstrating a sealing temperature of about 415° C.

* * * * *